W. D. WERTS.
REAR AXLE DRIVE MECHANISM FOR AUTOMOBILES.
APPLICATION FILED FEB. 21, 1918.
1,294,985.
Patented Feb. 18, 1919.
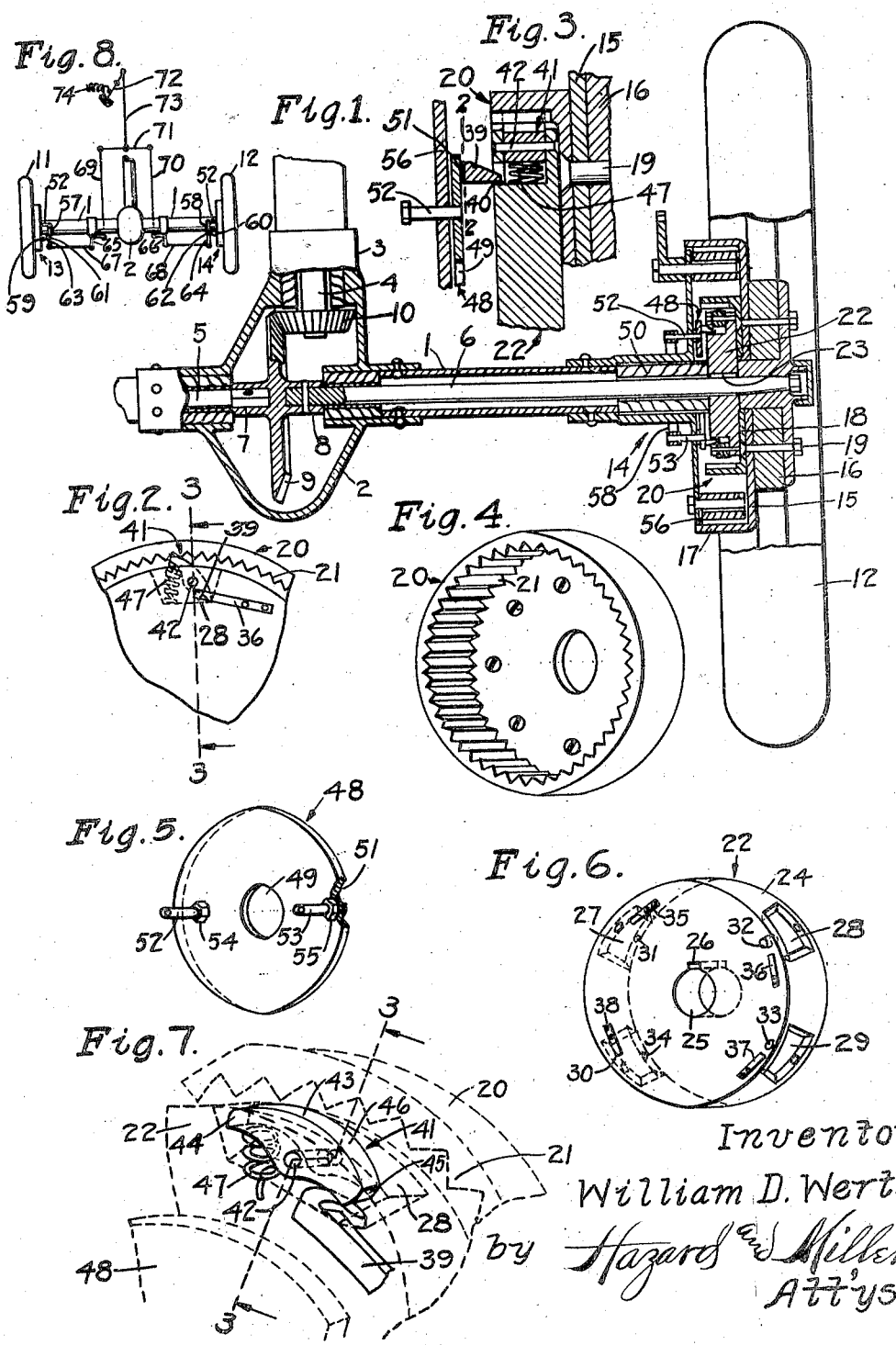
Inventor:
William D. Werts,
by Hazard and Miller
Att'ys.

UNITED STATES PATENT OFFICE.

WILLIAM D. WERTS, OF LOS ANGELES, CALIFORNIA, ASSIGNOR OF TWENTY ONE-HUNDREDTHS TO JOSEPH A. SHERER, OF LOS ANGELES, CALIFORNIA.

REAR-AXLE DRIVE MECHANISM FOR AUTOMOBILES.

1,294,985.

Specification of Letters Patent. Patented Feb. 18, 1919.

Application filed February 21, 1918. Serial No. 218,459.

*To all whom it may concern:*

Be it known that I, WILLIAM D. WERTS, a citizen of the United States, residing at Los Angeles, in the county of Los Angeles and State of California, have invented new and useful Improvements in Rear-Axle Drive Mechanisms for Automobiles, of which the following is a specification.

My object is to make a rear axle drive mechanism for motor vehicles which will have differential or compensating clutching means for driving forwardly, means for releasing the clutching means for coasting forwardly or backwardly, and means for reversing the clutching means to drive backwardly.

Figure 1 is a fragmentary sectional detail of a rear axle and one wheel constructed in accordance with the principles of my invention.

Fig. 2 is a fragmentary elevation showing one of the clutching means in normal position for driving forwardly, as seen on the line 2—2 of Fig. 3.

Fig. 3 is a fragmentary sectional detail on the lines 3—3 of Figs. 2 and 7.

Fig. 4 is a perspective of one of the ratchet wheels forming a driven part of a clutching means.

Fig. 5 is a perspective of the bearing plate for operating a clutching means to coasting or reversing positions.

Fig. 6 is a perspective of the pawl or driving wheel of a clutching means.

Fig. 7 is a fragmentary perspective, partly in dotted lines, of a pawl carried by the wheel shown in Fig. 6, for operating the wheel shown in Fig. 4.

Fig. 8 is a diagrammatic view of a rear axle and drawn especially to show the means for controlling the drive mechanism.

Referring to Fig. 1, the rear axle housing 1 is provided with a gear case 2 and a bearing 3 for the rear end of the drive shaft 4. The axle members 5 and 6 are squared upon their inner ends and inserted into the hubs 7 and 8 projecting from the driven bevel gear 9, so that the gear 9 connects the two members 5 and 6 together to form a single rigid axle. The bevel gear 9 is driven by a bevel gear 10 fixed upon the drive shaft 4. The rear wheels 11 and 12 are loosely journaled upon the ends of the axle and the wheel 11 is controlled by the clutching means 13 and the wheel 12 is controlled by the clutching means 14, in accordance with the principles of my invention.

The details of the clutching means 14 are as follows: The web 15 of the brake drum fits against the inner face of the wheel hub 16 and the brake drum 17 extends inwardly from the edge of the web 15. The web 18 of the ratchet wheel fits against the web 15 of the brake drum and bolts 19 are inserted through the web 18, through the web 15, and through the hub 16 to secure the parts rigidly together. The internal ratchet wheel 20 extends inwardly from the edge of the web 18 concentric to the brake drum 17 and has internal ratchet teeth 21. The pawl wheel 22 is fixed upon the axle member 6 by a key 23, the outer face of the pawl wheel fitting slidably against the inner face of the web 18.

The details of the pawl wheel 22 are shown in Fig. 6 and are as follows: A head 24 has a central axle opening 25 and a keyway 26 communicating with the axle opening. Pawl pockets 27, 28, 29 and 30 are arranged radially around the head 24 and extend inwardly from the periphery of the head, there being pawl pivot openings 31, 32, 33 and 34 through the head on planes parallel with the axle opening 25 and centrally of the pockets 27, 28, 29 and 30. Leaf springs 35, 36, 37 and 38 are secured at their rear ends to the inner face of the head 24, said springs extending concentrically from their attached ends and springing inwardly from the face of the head. As shown in Figs. 2 and 3, wedge-shaped cams 39 are formed integral with the outer ends of the springs and extend through openings 40 leading from the inner face of the head to the pockets 27, 28, 29 and 30. Pawls 41 are mounted in the pockets 27, 28, 29 and 30 upon pivot pins 42 inserted through the openings 31, 32, 33 and 34. The pawls 41 comprise central portions 43 and end portions 44 and 45, the pivot pins being inserted through the central portions 43 and the outer faces 46 of the pawls being curved. Expansive coil springs 47 are inserted in the pockets 27, 28, 29 and 30 against the portions 44 of the pawls, the tensions of the springs being exerted to throw the portions 44 of the pawls outwardly into engagement with the teeth 21 of the ratchet wheel 20, said pawls being set with the portions 44 all pointing in one direction, so that when said portions 44 are in engagement with the teeth 21 the wheel 12 will be driven forwardly.

The annular bearing plate 48 shown in Fig. 5 has a large central opening 49 to clear the roller bearing 50 and has a flat outer face 51 to bear against the heads of the cams 39 and has stud-bolts 52 and 53 tapped through the body of the plate and held by jam-nuts 54 and 55, said stud-bolts being arranged at diametrically opposite sides of the opening 49.

The housing plate 56 extends outwardly from the outer end of the axle housing 1 and forms a close sliding fit in the brake drum 17.

The bearing plate 48 is placed in position with the stud-bolts 52 and 53 extending inwardly through the housing plate 56.

The details of the clutching means 13 are exactly like the details of the clutching means 14 just described.

The yokes 57 and 58 straddle the axle housing 1 and are connected to the inner ends of the stud bolts 52 and 53. Brackets 59 and 60 extend inwardly from the housing plates 56 and the central portions of the yokes 57 and 58 are connected to these brackets by pivots 61 and 62, and arms 63 and 64 extend from the yokes 57 and 58 at the opposite sides of the pivots 61 and 62. Bell-crank levers 65 and 66 are pivotally mounted upon the axle housing 1 and connected to the arms 63 and 64 by links 67 and 68. The other ends of the bell-crank levers 65 and 66 are connected to links 69 and 70 and the forward ends of said links 69 and 70 are connected to an equalizer 71. A foot-pedal 72 is mounted convenient to the operator and a rod or cord 73 connects the lower end of the pedal 72 to the center of the equalizer 71, there being a retractile spring 74 to hold the pedal 72 in normal position, so that when the pedal is in normal position the cams 39 will be withdrawn to allow the springs 47 to operate the pawls to drive the wheels 11 and 12 forwardly and so that the ratchet wheels 20 may slip over the pawls when one wheel goes faster or farther than the other one, thereby providing a differential or compensating connection between the two rear drive wheels 11 and 12 and a clutching means between the drive shaft 4 and the drive wheels for driving forwardly. When it is desired to run the engine without driving the wheels or to allow the vehicle to coast forwardly or backwardly, the foot-pedal 72 may be operated half way, thereby moving the cams 39 inwardly far enough to overcome the tensions of the springs 47 and move the pawls 41 to their neutral positions, so that neither end of a pawl will contact with a ratchet wheel, and when it is desired to reverse the vehicle the foot-pedal 72 is operated clear over, thereby forcing the cams 39 under the pawls 41 to overcome the tensions of the springs 47 and throw the rear ends of the pawls into engagement with the ratchet teeth.

The springs 35, 36, 37 and 38 will drag upon the bearing plate 48 when the bearing plate is pressing against the cams 39 and the power driving backwardly.

When it is desired to use the compression of the engine for assisting the brakes in holding the vehicle when going down hill, the foot-pedal 72 is operated to reverse the clutching means so that the momentum of the vehicle will drive the engine.

Various changes may be made in the details of construction without departing from the spirit of my invention as claimed.

I claim:

In a rear axle drive mechanism for motor vehicles, a rear axle housing, a rear axle in the rear axle housing, a traction wheel loosely journaled upon one end of the axle, an internal ratchet wheel rigidly mounted upon the traction wheel, a pawl wheel fixed upon the axle and contained within the ratchet wheel, a double-ended pawl carried by the pawl wheel and normally engaging the ratchet wheel to drive forwardly, a spring for holding the pawl in normal forwardly driving position, a leaf spring secured at one end to the inner face of the pawl wheel, a wedge-shaped cam carried by the free end of the spring to engage the pawl; so that when the spring is pressed toward the pawl the pawl is moved to neutral position or to reverse position; an annular bearing plate mounted to slide longitudinally of the axle and having a flat face bearing against the head of the cam, a yoke connected to the annular bearing plate, a bell crank lever connected to the axle housing, a link connecting the bell crank lever to the yoke, a pedal, and a connection between the pedal and the bell crank lever, whereby the pawl may be operated by manipulating the pedal.

In testimony whereof I have signed my name to this specification.

WILLIAM D. WERTS.